(12) United States Patent
Biswal et al.

(10) Patent No.: US 7,403,958 B2
(45) Date of Patent: Jul. 22, 2008

(54) SYNCHRONIZATION-REPLICATION CONCURRENCY USING NON-SHARED SNAPSHOT QUERY ON A HISTORY TABLE AT READ-UNCOMMITTED ISOLATION LEVEL

(75) Inventors: Dilip Kumar Biswal, Union City, CA (US); Isaac Kam-Chak Cheng, San Jose, CA (US); Cecilia O. Chu, El Dorado Hills, CA (US); Donald Lee Clare, Morgan Hill, CA (US); Louis S. W. Mau, Cupertino, CA (US)

(73) Assignee: International Business Machines Corporation, Armonk, NY (US)

( * ) Notice: Subject to any disclaimer, the term of this patent is extended or adjusted under 35 U.S.C. 154(b) by 415 days.

(21) Appl. No.: 11/039,472

(22) Filed: Jan. 19, 2005

(65) Prior Publication Data
US 2006/0161606 A1   Jul. 20, 2006

(51) Int. Cl.
*G06F 17/30* (2006.01)
(52) U.S. Cl. .................... 707/204; 707/202; 707/203
(58) Field of Classification Search .............. 707/204
See application file for complete search history.

(56) References Cited

U.S. PATENT DOCUMENTS

| | | | |
|---|---|---|---|
| 5,623,661 A | 4/1997 | Hon | |
| 5,675,802 A | 10/1997 | Allen et al. ............... | 395/703 |
| 5,870,758 A | 2/1999 | Bamford et al. ........... | 707/201 |
| 5,870,759 A * | 2/1999 | Bauer et al. ............... | 707/201 |
| 5,950,210 A | 9/1999 | Nelson | |
| 5,956,713 A | 9/1999 | Bamford et al. ........... | 707/8 |
| 5,956,731 A | 9/1999 | Bamford et al. ........... | 707/201 |
| 5,963,959 A | 10/1999 | Sun et al. | |
| 5,999,931 A | 12/1999 | Breitbart et al. | |
| 6,092,086 A | 7/2000 | Martin et al. .............. | 707/202 |
| 6,289,335 B1 | 9/2001 | Downing et al. | |
| 6,295,541 B1 * | 9/2001 | Bodnar et al. ............. | 707/203 |
| 6,377,960 B1 * | 4/2002 | Qiu et al. .................. | 707/203 |
| 6,415,299 B1 | 7/2002 | Baisley et al. | |
| 6,460,052 B1 | 10/2002 | Thomas et al. | |
| 6,516,327 B1 * | 2/2003 | Zondervan et al. ........ | 707/200 |
| 6,631,374 B1 | 10/2003 | Klein et al. ............... | 707/8 |
| 6,665,815 B1 | 12/2003 | Goldstein et al. | |
| 6,799,189 B2 | 9/2004 | Huxoll .................... | 707/204 |
| 2002/0029218 A1 | 3/2002 | Bentley et al. | |
| 2002/0174416 A1 | 11/2002 | Bates et al. | |
| 2002/0178146 A1 | 11/2002 | Akella et al. | |
| 2003/0131025 A1 * | 7/2003 | Zondervan et al. ........ | 707/200 |
| 2003/0149702 A1 | 8/2003 | Saffer et al. | |
| 2004/0010487 A1 | 1/2004 | Prahlad et al. | |
| 2004/0019614 A1 * | 1/2004 | Wang ....................... | 707/202 |
| 2005/0086263 A1 | 4/2005 | Ngai et al. | |

(Continued)

*Primary Examiner*—Wilson Lee
*Assistant Examiner*—Binh V Ho
(74) *Attorney, Agent, or Firm*—Sawyer Law Group LLP

(57) ABSTRACT

A method and system for synchronization-replication concurrency maintain a history table for a data table in a mirror, where the history table can include redundant version values that indicate a period in which data values corresponding to the version values are valid. Replication can thus be performed between a source and a mirror for a current version of the data table, while synchronization is simultaneously performed between the mirror and a client for an earlier version of the data table using the history table.

14 Claims, 6 Drawing Sheets

U.S. PATENT DOCUMENTS

2005/0131964 A1  6/2005  Saxena
2005/0144198 A1  6/2005  Bergstraesser et al.
2006/0101092 A1  5/2006  Ishida et al.

* cited by examiner

VERSION 7

Table T

| key | data |
|---|---|
| 1 | 10 |
| 2 | 20 |

History Table: HT

| key | data | isDeleted | from | to |
|---|---|---|---|---|
| 1 | 10 | false | 1 | ∞ |
| 2 | 6 | false | 1 | 5 |
| 2 | 20 | false | 6 | ∞ |

VERSION 8

Table T

| key | data |
|---|---|
| 1 | 10 |
| 2 | 888 |
| 3 | 30 |

History Table: HT

| key | data | isDeleted | from | to |
|---|---|---|---|---|
| 1 | 10 | false | 1 | ∞ |
| 2 | 6 | false | 1 | 5 |
| 2 | 20 | false | 6 | 7 |
| 2 | 888 | false | 8 | ∞ |
| 3 | 30 | false | 8 | ∞ |

FIG. 5

RETRIEVE SNAPSHOT AT VERSION 7:

SELECT key, data FROM HistoryTable WHERE
isDeleted=false AND from <= 7 AND 7 <= to History Table: HT

| key | data | isDeleted | from | | to |
|---|---|---|---|---|---|
| 1 | 10 | false | 1 | Yes | ∞ |
| 2 | 6 | false | 1 | No | 5 |
| 2 | 20 | false | 6 | Yes | 7 |
| 2 | 888 | false | 8 | No | ∞ |
| 3 | 30 | false | 8 | No | ∞ |

Snapshot Retrieved

| key | data |
|---|---|
| 1 | 10 |
| 2 | 20 |

SYNCHRONIZATION-REPLICATION CONCURRENCY USING NON-SHARED SNAPSHOT QUERY ON A HISTORY TABLE AT READ-UNCOMMITTED ISOLATION LEVEL

CROSS-REFERENCE TO RELATED APPLICATIONS

This application is related to co-pending U.S. patent application Ser. No. 11/039,528, entitled "Redundant Version Information in History Table That Enables Efficient Snapshot Querying", filed concurrently herewith.

FIELD OF THE INVENTION

The present invention relates to data replication and synchronization, and more particularly to the simultaneous replication and synchronization of data.

BACKGROUND OF THE INVENTION

FIG. 1 illustrates a conventional system for data replication and synchronization. The system of FIG. 1 has three tiers: a source 101, a mirror 102, and a client 103. The client 103 can be a mobile database. The mirror 102 and source 101 are database servers. The mirror 102 stores a subset of the data at the source 101. The client 103 typically stores a subset of the data at the mirror 102. Replication is the transmission of data between the mirror 102 and the source 101 with the purpose of keeping their data in sync. Synchronization is the transmission of data between the client 103 and the mirror 102 to keep their data in sync. Typically, synchronization occurs more often than replication, and there are many more clients than mirrors. The replication and the synchronization attempt to occur simultaneously. "Simultaneous" as used in this specification, refers to instructions within two different threads attempting to be executed concurrently.

One conventional approach for facilitating replication and synchronization is to use a single snapshot of the source 101, shared by both the synchronization and the replication. However, while the data is being written during the replication, any attempts to simultaneously read the data during synchronization are blocked to maintain the integrity of the data retrieved. "Simultaneous" as used in this specification, refers to instructions within two different threads attempting to be executed concurrently. In another conventional approach, a plurality of snapshots is shared while providing isolation levels in the mirror 102. Although this approach allows the simultaneous write (during replication) and read (during synchronization) of the snapshots, simultaneous writes during replication and synchronization are blocked. Thus, the conventional approaches are limited in their efficiency of the replication and synchronization processes.

Accordingly, there exists a need for an improved method and system for synchronization-replication concurrency. The method and system should allow simultaneous reads, writes, and read-writes during replication and synchronization, while maintaining data integrity. The present invention addresses such a need.

SUMMARY OF THE INVENTION

An improved method and system for synchronization-replication concurrency maintain a history table for a data table in the mirror 102, where the history table can include redundant version values that indicate a period in which data values corresponding to the version values are valid. Replication can thus be performed between a source and a mirror for a current version of the data table, while synchronization is simultaneously performed between the mirror and a client for an earlier version of the data table using the history table. Simultaneous reads, writes, and read-writes are possible while maintaining data reliability. The replication and synchronization processes can be performed at the read-uncommitted isolation level to increase efficiency. The method and system thus increase overall data throughput, reduce client response time, and dramatically enhance end-user satisfaction.

BRIEF DESCRIPTION OF THE FIGURES

FIG. 5 illustrates example data and history tables.

DETAILED DESCRIPTION

The present invention provides an improved method and system for synchronization-replication concurrency. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

To more particularly describe the features of the present invention, please refer to FIGS. 2 through 6 in conjunction with the discussion below.

Figure 1:
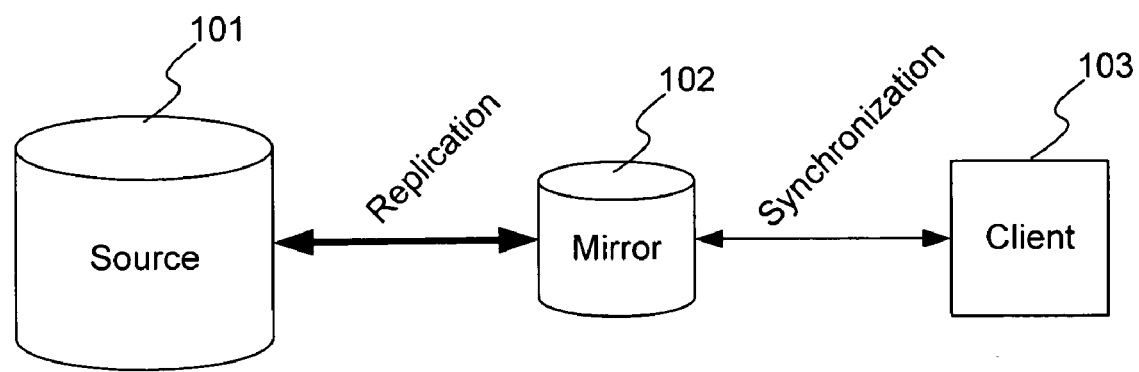
FIG. 1 illustrates a conventional system for data replication and synchronization.
Figure 2:
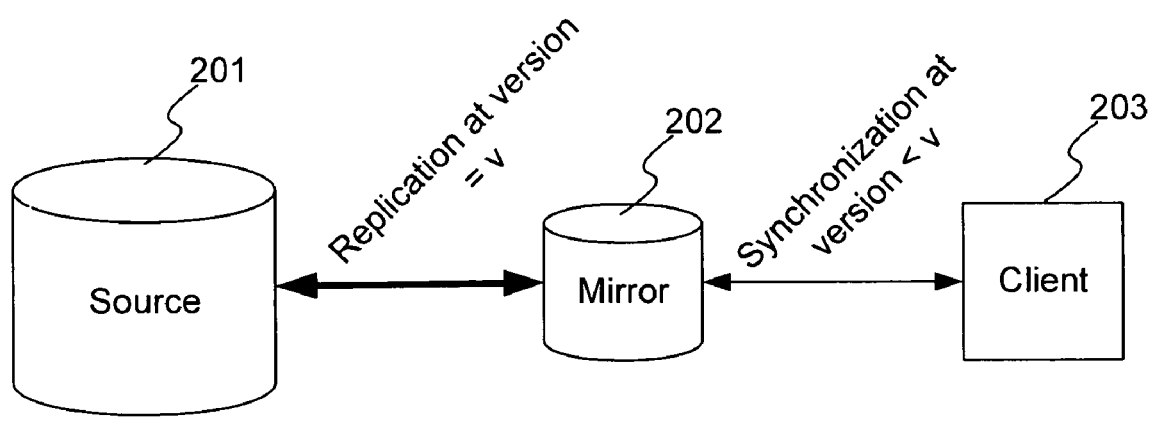
FIGS. 2 and 3 illustrate an embodiment of a system and method, respectively, for synchronization-replication concurrency in accordance with the present invention.
Figure 3:
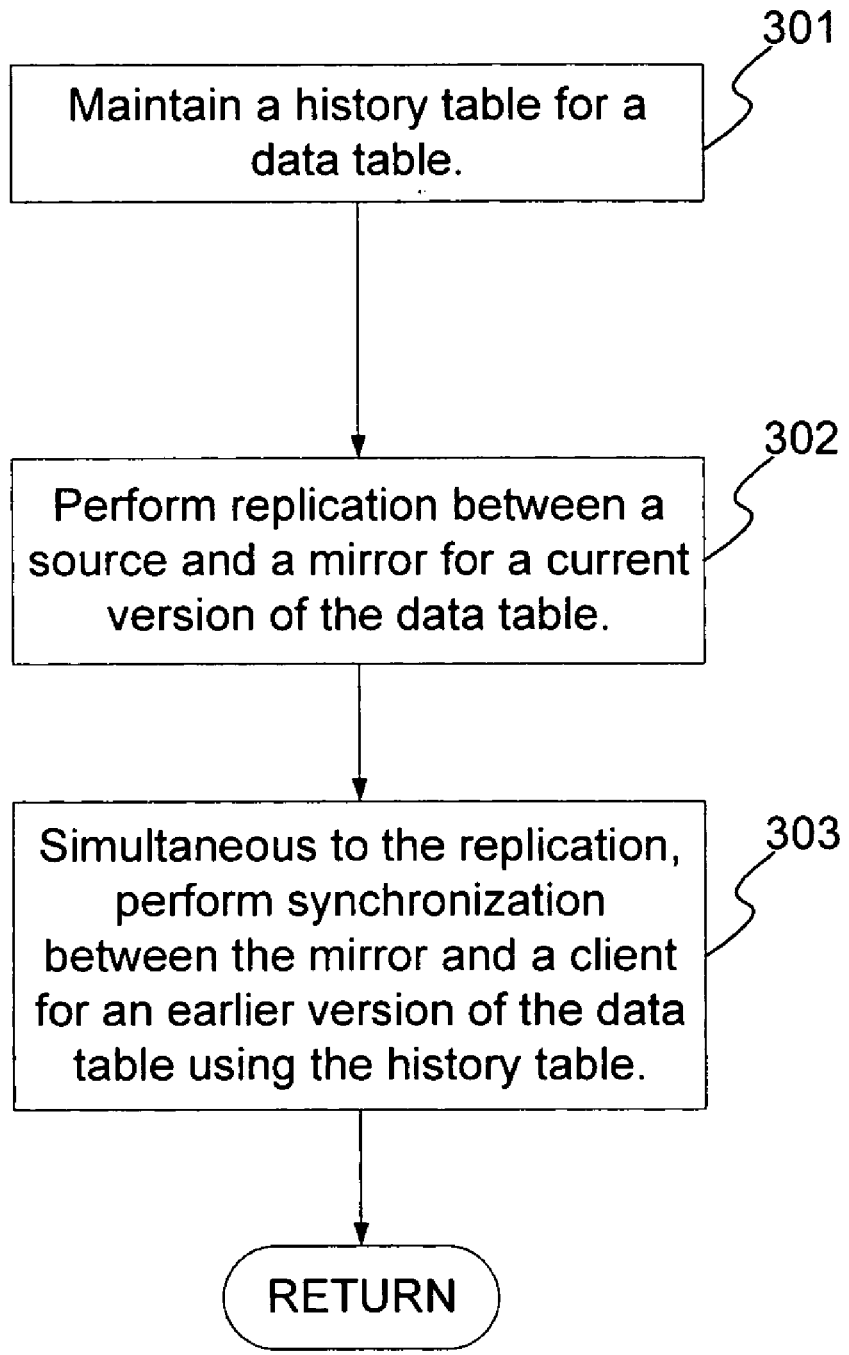

FIGS. 2 and 3 illustrate an embodiment of a system and method, respectively, for synchronization-replication concurrency in accordance with the present invention. In this system, a history table is maintained for a data table at the mirror 202, via step 301. In this embodiment, the history table includes redundant version values that indicate a period in which the data values corresponding to the version values are valid. The history table stores each row insert, delete, and update performed on the data table at the source 201. The replication of the data between the source 201 and the mirror 202 is then performed at a current version "v", via step 302. The synchronization of the data between the mirror 202 and the client 203 is then performed simultaneously with the replication at an earlier version of the data table using the history table, via step 303. Because the replication and the synchronization are being performed at different versions of the data table, the replication and synchronization processes do not share the same snapshot of the data table. The use of the redundant version values in the history table allows row inserts, deletes, and updates to occur during replication without affecting the data integrity of the synchronization. Thus, the simultaneous writes, reads, and read-writes can occur, rendering the synchronization process more efficient.

Figure 4:
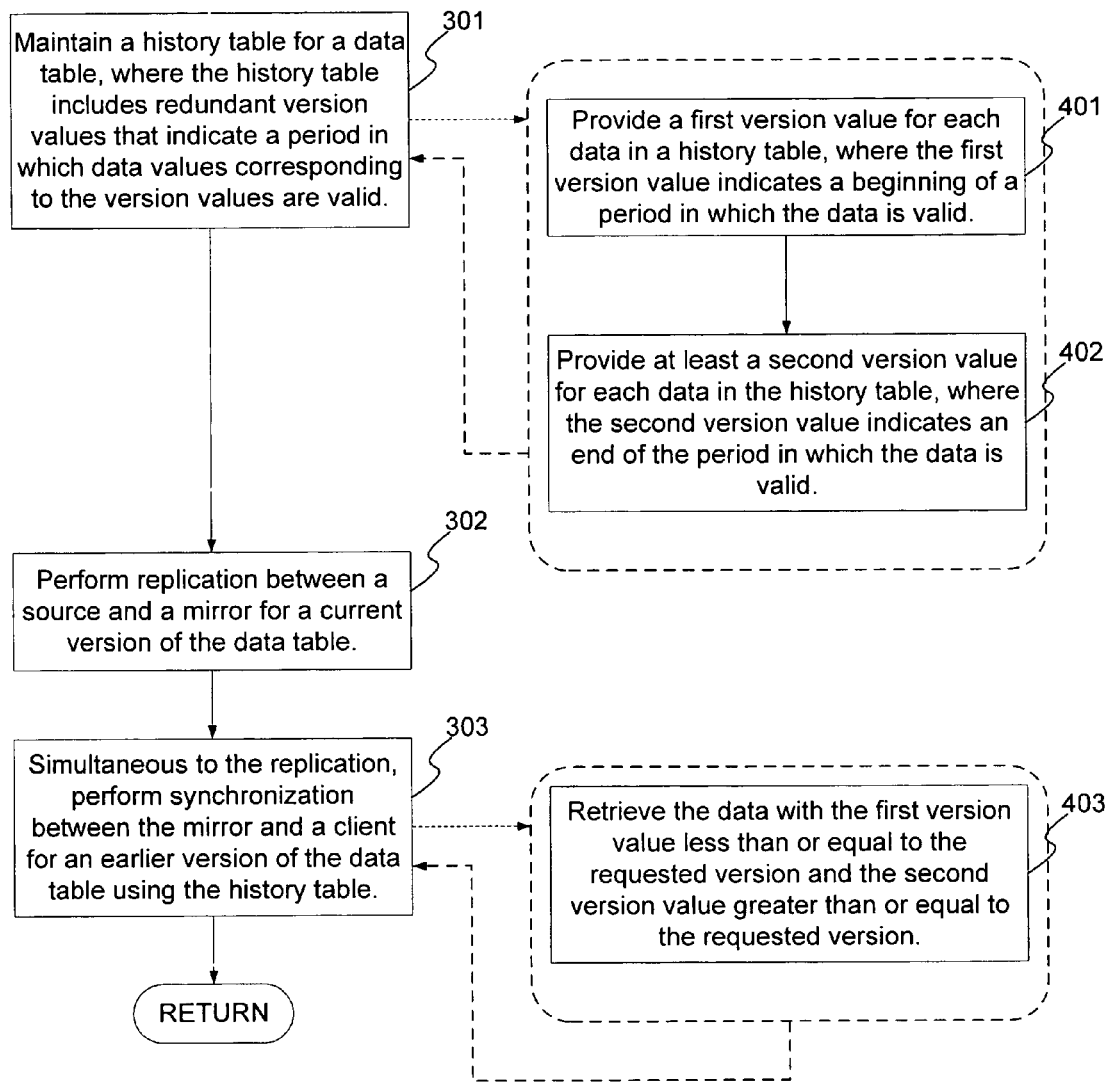
FIG. 4 is a flowchart illustrating in more detail the embodiment of the method in accordance with the present invention.

FIG. 4 is a flowchart illustrating in more detail the embodiment of the method in accordance with the present invention.

In maintaining the history table, a first version value for each data in the history table is provided, where the first version value indicates a beginning of a period in which the data is valid, via step 401. Also, at least a second version value for each data in the history table is provided, where the second version value indicates an end of the period in which the data is valid, via step 402. The maintenance of these redundant version values is described further in co-pending U.S. patent application Ser. No. 11/039,528, entitled, "Redundant Version Information in History Table That Enables Efficient Snapshot Querying", filed on Jan. 19, 2005, and assigned to the assignee of the present application. Applicant hereby incorporates this patent application by reference. Via step 403, in performing the synchronization, the data with the first version value less than or equal to the requested version and the second version value greater than or equal to the requested version are retrieved. The requested version value is an earlier version than that for the replication.

Although the embodiment above is described in the context of a history table that uses redundant version values, one of ordinary skill in the art will understand that other types of history tables may be used without departing from the spirit and scope of the present invention.

FIG. 5 illustrates a data table, T, and its corresponding history table, HT, at versions 7 and 8. In the history table, the first version value is stored in the 'from' column and the second version value is stored in the 'to' column. The 'isDeleted' column stores Boolean values indicating whether the recorded change in the data table was a row delete.

At version 7, the history table indicates that the data value '10' for key '1' is valid from version 1 onward (represented by infinity), the data value '6' for key '2' is valid from version 1 to 5, and the data value '20' for key '2' is valid from version 6 onward. At version 8, a row update is performed for key '2' to update the data value to '888'. Correspondingly, a row for key '2' and data value '888' is inserted into the history table, with its 'from' value set to '8' and the 'to' value set to infinity. The old row for key '2' with data value '20' is updated so that the 'to' value is set to '7'. This indicates that for key '2', the data value '20' is valid from version 6 to 7, while the data value '888' is valid from version 8 onward. Also at version 8, a row insert is performed on the data table to insert key '3' with data value '30'. Correspondingly, a row for key '3' and data value '30' is inserted into the history table, with its 'from' value set to '8' and the 'to' value set to infinity. This indicates that for key '3', the data value '30' is valid from version 8 onward.

Figure 6:
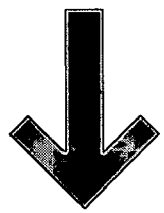
FIG. 6 illustrates an example synchronization performed simultaneously with a replication in accordance with the present invention.
Figure 6:
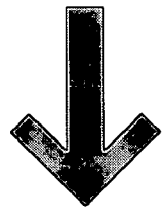

Assume that replication is performed at version 8, and synchronization is performed at version 7. As illustrated in FIG. 6, the following snapshot query is used to retrieve the snapshot at version 7: SELECT key, data FROM HT WHERE isDeleted=false AND from <=7 AND 7<= to. The rows in the history table that satisfy the query are indicated in FIG. 6 with a "Yes", resulting in the illustrated retrieved snapshot. The correct snapshot is thus returned.

With the method and system in accordance with the present invention, no new row can be introduced into and no row can be deleted from the previous version of the data table used by synchronization during replication of the current version. This is because any new row introduced by the replication would have a 'from' version value in the history table greater than the version for synchronization. These rows in the history table would not be retrieved by the snapshot query. Also, the 'from' version value for old rows in the history table is never changed. Thus, a snapshot of a previous version will be reliably retrieved by the snapshot query. This is true even at the read-uncommitted isolation level. The simultaneous replication and synchronization can thus be performed at this isolation level, increasing the efficiency of the processes, while also ensuring data reliability.

An improved method and system for synchronization-replication concurrency have been disclosed. The method and system maintain a history table for a data table, where the history table includes redundant version values that indicate a period in which data values corresponding to the version values are valid. Replication can thus be performed between a source and a mirror for a current version of the data table, while synchronization is simultaneously performed between the mirror and a client for an earlier version of the data table using the history table. Simultaneous reads, writes, and read-writes are possible while maintaining data reliability. The replication and synchronization processes can be performed at the read-uncommitted isolation level to increase efficiency. The method and system thus increase overall data throughput, reduce client response time, and dramatically enhance end-user satisfaction.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for performing a replication of data between a first database server and a second database server concurrently with a synchronization of the data between the second database server and a client, the method comprising:

the second database server storing and maintaining a history table that includes data values that correspond to a first version of the data and includes data values that correspond with a second version of the data, the first and second versions being stored at the same time in the table;

performing the replication of the data between the first database server and the second database server using the data values in the history table that correspond to the first version of the data; and performing the synchronization of the data between the second database server and the client using the data values in the history table that correspond to the second version of the data, wherein the synchronization between the second database server and the client is performed concurrently with performing the replication of the data and permits one or more of a row insert, delete, or update to occur to the data during the replication of the data between the first database server and the second database server without affecting data integrity associated with the synchronization of the data between the second database server and the client, and wherein the second version of the data is an earlier version of the data relative to the first version of the data.

2. The method of claim 1, wherein instructions on a replication thread and instructions on a synchronization thread are executed concurrently.

3. The method of claim 1, wherein the replication of the data between the first database server and the second database server and the synchronization of the data between the second database server and the client are performed at a read-uncommitted isolation level.

4. A system comprising:

a first database server storing data in a data table;

a second database server storing a history table that includes data values that correspond to a first version of the data in the data table and includes data values that correspond with a second version of the data in the data table, the first and second versions being stored at the same time in the table; and, a client in communication with the second database server, wherein replication of data between the first database server and the second database server is performed using the data values in the history table that correspond to the first version of the data, wherein synchronization of the data between the second database server and the client is performed using the data values in the history table that correspond to the second version of the data and permits one or more of a row insert, delete, or update to occur to the data during the replication of the data between the first database server and the second database server without affecting data integrity associated with the synchronization of the data between the second database server and the client, and wherein the second version of the data is an earlier version of the data relative to the first version of the data, and wherein the synchronization of the data between the second database server and the client is performed concurrently with the replication of the data between the first database server and the second database server.

5. The system of claim 4, wherein instructions on a replication thread and instructions on a synchronization thread are executed concurrently.

6. A computer readable medium encoded with a computer program for performing a replication of data between a first database server and a second database server concurrently with a synchronization of the data between the second database server and a client, the computer program comprising computer executable code for:

the second database server storing and maintaining a history table that includes data values that correspond to a first version of the data and includes data values that correspond with a second version of the data, the first and second versions being stored at the same time in the table;

performing the replication of the data between the first database server and the second database server using the data values in the history table that correspond to the first version of the data; and performing the synchronization of the data between the second database server and the client using the data values in the history table that correspond to the second version of the data, wherein the synchronization between the second database server and the client is performed concurrently with performing the replication of the data and permits one or more of a row insert, delete, or update to occur to the data during the replication of the data between the first database server and the second database server without affecting data integrity associated with the synchronization of the data between the second database server and the client, and wherein the second version of the data is an earlier version of the data relative to the first version of the data.

7. The computer readable medium of claim 6, wherein instructions on a replication thread and instructions on a synchronization thread are executed concurrently.

8. The computer readable medium of claim 6, wherein the replication of the data between the first database server and the second database server and the synchronization of the data between the second database server and the client are performed at a read-uncommitted isolation level.

9. The method of claim 1, wherein each of the first version of the data and the second version of the data is retrieved from the history table though performing a query on the history table.

10. The method of claim 1, wherein:
the first database server is a source configured to store data;
the second database server is a mirror configured to store a subset of the data stored at the source; and
the client is configured to store a subset of the data stored at the mirror.

11. The system of claim 4, wherein each of the first version of the data and the second version of the data is retrieved from the history table through performing a query on the history table.

12. The system of claim 4, wherein:
the first database server is a source configured to store data;
the second database server is a mirror configured to store a subset of the data stored at the source; and
the client is configured to store a subset of the data stored at the mirror.

13. The computer readable medium of claim 6, wherein each of the first version of the data and the second version of the data is retrieved from the history table through performing a query on the history table.

14. The computer readable medium of claim 6, wherein:
the first database server is a source configured to store data;
the second database server is a mirror configured to store a subset of the data stored at the source; and
the client is configured to store a subset of the data stored at the mirror.

* * * * *